United States Patent
Reda et al.

(10) Patent No.: US 11,521,047 B1
(45) Date of Patent: Dec. 6, 2022

(54) DEEP NEURAL NETWORK

(71) Applicant: Brown University, Providence, RI (US)

(72) Inventors: Sherief Reda, Barrington, RI (US); Hokchhay Tann, North Reading, MA (US); Soheil Hashemi, Boston, MA (US); R. Iris Bahar, Providence, RI (US)

(73) Assignee: Brown University, Providence, RI (US)

( * ) Notice: Subject to any disclaimer, the term of this patent is extended or adjusted under 35 U.S.C. 154(b) by 343 days.

(21) Appl. No.: 16/391,007

(22) Filed: Apr. 22, 2019

Related U.S. Application Data

(60) Provisional application No. 62/660,753, filed on Apr. 20, 2018, provisional application No. 62/660,744, filed on Apr. 20, 2018.

(51) Int. Cl.
*G06N 3/063* (2006.01)
*G06N 3/08* (2006.01)

(52) U.S. Cl.
CPC ............. *G06N 3/063* (2013.01); *G06N 3/084* (2013.01)

(58) Field of Classification Search
CPC ............................... G06N 3/063; G06N 3/084
See application file for complete search history.

(56) References Cited

U.S. PATENT DOCUMENTS

2018/0322391 A1* 11/2018 Wu .................. G06N 3/084

FOREIGN PATENT DOCUMENTS

| DE | 19718224 A1 * | 11/1997 | ............. G06N 3/063 |
|----|----|----|----|
| EP | 0266004 A2 * | 10/1987 | ............. H03H 17/02 |

OTHER PUBLICATIONS

Hashemi, Soheil, et al. "Understanding the Impact of Precision Quantization on the Accuracy and Energy of Neural Networks." arXiv preprint arXiv: 1612.03940 (Year: 2016).*
Gysel P et al. Ristretto: A framework for empirical study of resource-efficient inference in convolutional neural networks. IEEE transactions on neural networks and learning systems. (Year: 2018).*
Chen, Tianshi, et al. "Diannao: A small-footprint high-throughput accelerator for ubiquitous machine-learning." ACM SIGARCH Computer Architecture News 42.1 (Year: 2014).*
Mohammad Motamedi et al. "Hardware-oriented approximation of convolutional neural networks." arXiv preprint arXiv: 1604.03168 (Year: 2016).*
Courbariaux, Matthieu et al. "Training deep neural networks with low precision multiplications." arXiv: 1412.7024v5 (Year: 2015).*
Hashemi et al., "Understanding the Impact of Precision Quantization on the Accuracy and Energy of Neural Networks", Design, Automation & Test in Europe Conference & Exhibition, 2017, pp. 1474-1479.
Tann et al., "Hardware-Software Dodesign of Accurate, Multiplier-free Deep Neural Networks", IEEE/ACM ISBN1-4503-2138.9. May 11, 2017.

\* cited by examiner

*Primary Examiner* — Michael J Huntley
*Assistant Examiner* — Adam C Standke
(74) *Attorney, Agent, or Firm* — Adler Pollock & Sheehan P.C.

(57) ABSTRACT

A hardware neural network system includes an input buffer for input neurons (Nbin), an output buffer for output neurons (Nbout), and a third buffer for synaptic weights (SB) connected to a Neural Functional Unit (NFU) and a control logic (CP) for performing synapses and neurons computations. The NFU pipelines a computation into stages, the stages including weight blocks (WB), an adder tree, and a non-linearity function.

2 Claims, 7 Drawing Sheets

```
// FLnet: the input floating-point net.
// t_logits: the floating-point net's logits.
Input : FLnet, t_logits
1  begin Phase 1
      // MF_DFPnet: dynamic fixed-point network
      Output: MF_DFPnet
      // Quantize the weights to powers of two and
      // inputs to 8-bit fixed-point
2     MF_DFPnet = Quantize_8bit(FLnet);
      // Fine-tuning MF_DFPnet until convergence
      // using hard data labels as in [5].
3     for i = 1 to Convergence do
4        Forward_Pass(MF_DFPnet);
         // Compute gradients
5        grads=Grad(MF_DFPnet, true_labels);
         // Backpropagate grad and update weights:
6        Backward_update(FLnet, grads);
7        MF_DFPnet = Quantize_8bit(FLnet);
8     end
9  end
10 begin Phase 2
      // Additional training using different
11    for j = i to Convergence do
12       Forward_Pass(MF_DFPnet);
13       grads=Grad(MF_DFPnet, true_labels);
         // Also with respect to teacher's logits
14       grad_logit=Grad(MF_DFPnet, t_logits);
         // gradient to update:
15       gradients=grads + β·grad_logit;
16       Backward_update(FLnet, gradients);
17       MF_DFPnet = Quantize_8bit(FLnet);
18    end
19    return MF_DFPnet
20 end
   // Phase 3: If using ensemble, repeat Phase 1
   // and 2 with different input FLnet.
```

FIG. 2

DEEP NEURAL NETWORK

CROSS REFERENCE TO RELATED APPLICATIONS

This application claims benefit from U.S. Provisional Patent Application Ser. No. 62/660,744, filed Apr. 20, 2018, and U.S. Provisional Patent Application Ser. No. 62/660,753, filed Apr. 20, 2018, which are both incorporated by reference in their entireties.

STATEMENT REGARDING GOVERNMENT INTEREST

This invention was made with government support under 1420864 awarded by the National Science Foundation and NNX13AN07A awarded by NASA. The government has certain rights in the invention.

BACKGROUND OF THE INVENTION

The present invention relates generally to networks, and more particularly to a deep neural networks.

In general, neural networks are a set of algorithms, modeled loosely after the human brain, that are designed to recognize patterns. They interpret sensory data through a kind of machine perception, labeling or clustering raw input. The patterns they recognize are numerical, contained in vectors, into which all real-world data, be it images, sound, text or time series, must be translated.

Neural networks can help to cluster and classify. One may think of them as a clustering and classification layer on top of the data that is stored and managed. They help to group unlabeled data according to similarities among the example inputs, and they classify data when they have a labeled dataset to train on. Neural networks can also extract features that are fed to other algorithms for clustering and classification.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In general, in one aspect, the invention features a hardware neural network system including an input buffer for input neurons (Nbin), an output buffer for output neurons (Nbout), and a third buffer for synaptic weights (SB) connected to a Neural Functional Unit (NFU) and a control logic (CP) for performing synapses and neurons computations.

In another aspect, the invention features a method including mapping floating-point based Deep Neural Networks (DNNs) to 8-bit dynamic fixed-point networks with integer power-of-two weights with no change in network architecture, the 8-bit dynamic fixed-point DNNs enabling different radix points between layers.

In another aspect, the invention features a hardware accelerator including memory subsystems used to store intermediate values and outputs and buffer inputs and weights, the memory systems comprising an SRAM buffer array, a DMA, and control logic responsible for ensuring that data is loaded into buffers and made available to a neural functional unit (NFU) at an appropriate clock cycle without additional latency.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

These and other features, aspects, and advantages of the present invention will become better understood with reference to the following description, appended claims, and accompanying drawings where:

FIG. 2 illustrates an exemplary flow diagram.

DETAILED DESCRIPTION

Figure 1:
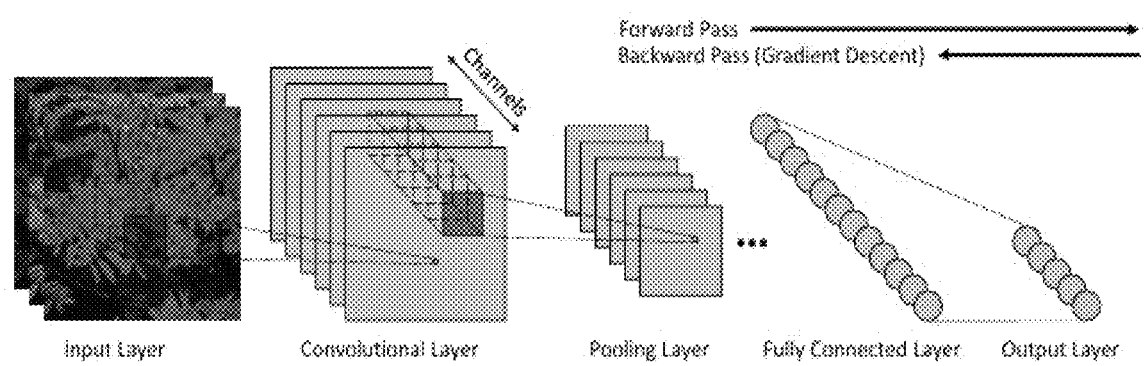
FIG. 1 illustrates a structure of an exemplary deep neural network.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

While Deep Neural Networks (DNNs) push the state-of-the-art in many machine learning applications, they often require millions of expensive floating-point operations for each input classification. This computation overhead limits the applicability of DNNs to low-power, embedded platforms and incurs high cost in data centers. This motivates recent interests in designing low-power, low-latency DNNs based on fixed-point, ternary, or even binary data precision. While recent works in this area offer promising results, they often lead to large accuracy drops when compared to the floating-point networks. The present invention maps floating-point based DNNs to 8-bit dynamic fixed-point networks with integer power-of-two weights with no change in network architecture. Our dynamic fixed-point DNNs enable different radix points between layers. During inference, power-of-two weights allow multiplications to be replaced with arithmetic shifts, while the 8-bit fixed-point representation simplifies both the buffer and adder design.

In addition, the present invention includes a hardware accelerator to achieve low-power, low-latency inference with insignificant degradation in accuracy. Using the accelerator design with the CIFAR-10 and ImageNet datasets, methods of the present invention achieve significant power and energy savings while increasing the classification accuracy.

Recent availability of high-performance computing platforms has enabled the success of deep neural networks (DNNs) in many demanding fields, especially in the domains of machine learning and computer vision. At the same time, applications of DNNs have proliferated to platforms ranging from data centers to embedded systems, which open up new challenges in low-power, low-latency implementations that can maintain state-of-the-art accuracy. While systems with general purpose CPUs and GPUs are capable of processing very large DNNs, they have high power requirements and are not suitable for embedded systems, which has led to increasing interest in the design of low-power custom hardware accelerators. In designing low-power hardware for DNNs, one major challenge stems from the high precision used in the network parameters. State-of-the-art DNNs in classification accuracy are typically implemented using single precision (32-bit) floating-point, which requires large memory size for both the network parameters as well as the intermediate computations. Complex hardware multipliers and adders are also needed to operate on such representations.

On the other hand, the inherent resiliency of DNNs to insignificant errors, has resulted in a wide array of hardware-software codesign techniques targeted for lowering the energy and memory footprint of these networks. Such techniques broadly aim either to lower the cost of each operation by reducing the precision or to lower the number of required operations, for example by knowledge distillation. While prior methods offer low-precision DNNs with little reduction in accuracy, the smallest fixed-point solutions proposed require 8-bits or more for both the activation and network parameters. Furthermore, while methods with binary and ternary precisions prove effective for smaller networks with small datasets, they often lead to unacceptable accuracy loss on large datasets such as ImageNet. In addition, these low-precision network techniques usually require precision specific network designs and therefore cannot readily be used on a specific network without an expensive architecture exploration.

The present invention solves the low-power high-accuracy challenge for DNNs by a hardware-software codesign to transform existing floating-point networks to 8-bit dynamic fixed-point networks with integer power-of-two weights without changing the network topology. The use of power-of-two weights enables a multiplier-free hardware accelerator design, which efficiently performs computation on dynamic fixed-point precision.

The present invention compresses floating-point networks to 8-bit dynamic fixed-point precision with integer power-of-two weights. It then fine-tunes the quantized network using student-teacher learning to improve classification accuracy. The technique requires no change to the network architecture.

The present invention includes a multiplier-free hardware accelerator for DNNs that is synthesized using an industry level library. The accelerator efficiently operates using 8-bit multiplier-free dynamic fixed-point precision.

The present invention utilizes an ensemble of dynamic fixed-point networks, resulting in improvements in classification accuracy compared to the floating-point counterpart, while still allowing large energy savings.

In FIG. 1 an exemplary template structure of a deep neural network is illustrated. The three layer types that are more commonly used in DNNs are:

Convolutional Layers where each neuron is connected to a subset of inputs with the same spatial dimensions as the kernels, which are typically 3-dimensional as shown in FIG. 1. These layers are used for feature extractions.

Pooling Layers used to down sample input data.

Fully-Connected Layers that are similar to convolutional layers with differences being that inputs and kernels are one-dimensional vectors. These layers are often used toward the end as classifier, where the output vector from the final layer (logits) is fed to a logistic function.

Non-Linearity: For each scalar input x, this layer outputs $\sigma(x)$, where $\sigma(\bullet)$ is a predefined non-linear function, such as $\tanh(\bullet)$, rectify linear unit (ReLU), and so forth.

DNNs typically are based on floating-point precision and trained with back propagation algorithm. Each training step involves two phases: forward and backward. In the forward phase, the network is used to perform classification on the input. Afterward, the gradients are propagated back to each layer in the backward phase to update the network's parameters. The biggest portion of the computational demands are required by the multiplier blocks utilized in the convolutional and fully connected layers.

As mentioned above, in order to simplify the hardware implementation, the present invention alters the compute model by replacing multipliers with shift blocks and reducing signal bit width to 8 bits. The signals are represented using dynamic fixed-point format since synaptic weights and signals in different layers can vary greatly in range. Employing a uniform fixed-point representation across the layers would require large bit widths to accommodate for such range. Even with 16-bit fixed-point, significant accuracy drop is observed when compared to floating-point representation.

Referring to the algorithm in FIG. 2, in order to construct a dynamic fixed-point network, we take as input a fully trained floating-point network. We first quantize on this input network by rounding its weights to the nearest powers of two. We also round the intermediate signals to 8-bit dynamic fixed-point (line 2). We then perform fine-tuning on the network to recover from accuracy loss due to quantization (lines 1-9).

DNNs are typically trained using the back propagation algorithm with variants of gradient descent methods, which can be ill-suited for low-precision networks. The computed gradients and learning rates are typically very small, which means that parameters may not be updated at all due to their low-precision format. Intuitively, this requires high precision in order to converge to a good minima. However, integer power-of-two weights only allow large increment jumps.

Figure 2A:
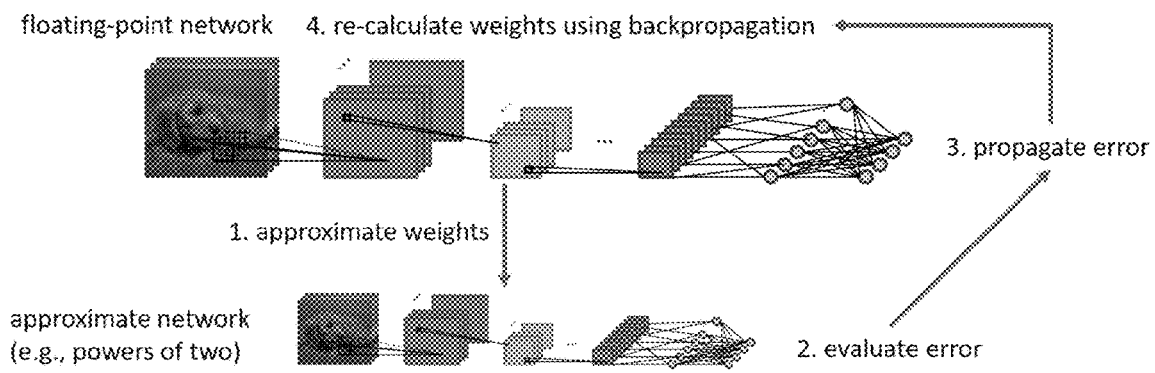
FIG. 2A illustrates an exemplary training procedure for DNNS with reduced-precision parameters.

To combat this disparity, the present invention keeps two sets of weights during the training process: one in quantized precision and one in floating-point. An overview of this training procedure for DNNs with reduced-precision parameters is shown in FIG. 2A. As shown in Algorithm 1, during forward propagation, the floating-point weight set is stochastically or deterministically quantized before the input data is evaluated (line 4). We found that deterministic quantization gives better performance. The output result of the quantized network is then used to compute the loss with respect to the true label of the data (line 5). The gradients with respect to this loss are then used to update the floating-point parameters during backward propagation (line 6), and the process is repeated until convergence. This approach allows small gradients to accumulate over time and eventually cause incremental updates in the quantized weights.

We perform additional training with a different loss function once training with hard labels no longer improves the performance. As shown in the Algorithm in FIG. 2, lines 10-20, in addition to using hard labels, we introduce student-teacher learning, where a student network is trained to mimic the outputs of a teacher network. Both networks are floating-point based, but the student typically has a far fewer number of parameters. We treat the dynamic fixed-point network as the student and the floating-point network as the teacher.

The loss function in the student-teacher learning incorporates the knowledge learned by the teacher model. Suppose S is the student network, and T is the teacher with output logit vectors $z_S$ and $z_T$ and class probability $P_S$ and $P_T$ respectively. The softmax regression function is relaxed by introducing a temperature parameter $\tau$ such that $P_{S,i}=\exp(z_{S,i}/\tau)/\Sigma_j \exp(z_{S,j}/\tau)$ and $P_{T,i}=\exp(z_{T,i}/\tau)/\Sigma_j \exp(z_{T,j}/\tau)$. Let $W_S$ be the parameters of the student network, then the loss function for the student model is define to be:

$$L(W_S)=H(Y, P_S)+\beta \cdot H(P_T, P_S) \quad (1)$$

where $\beta$ is a tunable parameter, H is the cross entropy and Y is the one-hot true data label. Using $\tau \gg z_S, z_T$, we have $P_i=\exp(z_{S,i}/\tau)/\Sigma_j\exp(z_{S,j}/\tau) \approx 1+Z_i/\tau/N+\Sigma_j z_j/\tau$ where N is the length of vectors $z_S, z_T$. With zero-meaned $z_S, z_T$ ($\Sigma_j z_{S,j}=\Sigma_j T, j=0$), the approximated gradient is then:

$$\delta L(W_s)/\delta z_{S,i} \approx (P_{S,i} - Y_i) + \beta/N \cdot \tau^2 \cdot (z_{S,i} - z_{T,i}). \quad (2)$$

Deploying an ensemble of DNNs has been proven to be a simple and effective method to boost the inference accuracy of a DNN. The idea is to independent train multiple DNNs of the same architecture and use them to evaluate each input. The output is then chosen based on the majority of votes. Suppose the ensemble consists of M networks producing output logit vectors $z_i$, $i \in [1, M]$. Then the output class can simply be the maximum element in $1/M \Sigma^M_{i=1} z_i$.

Figure 2B:
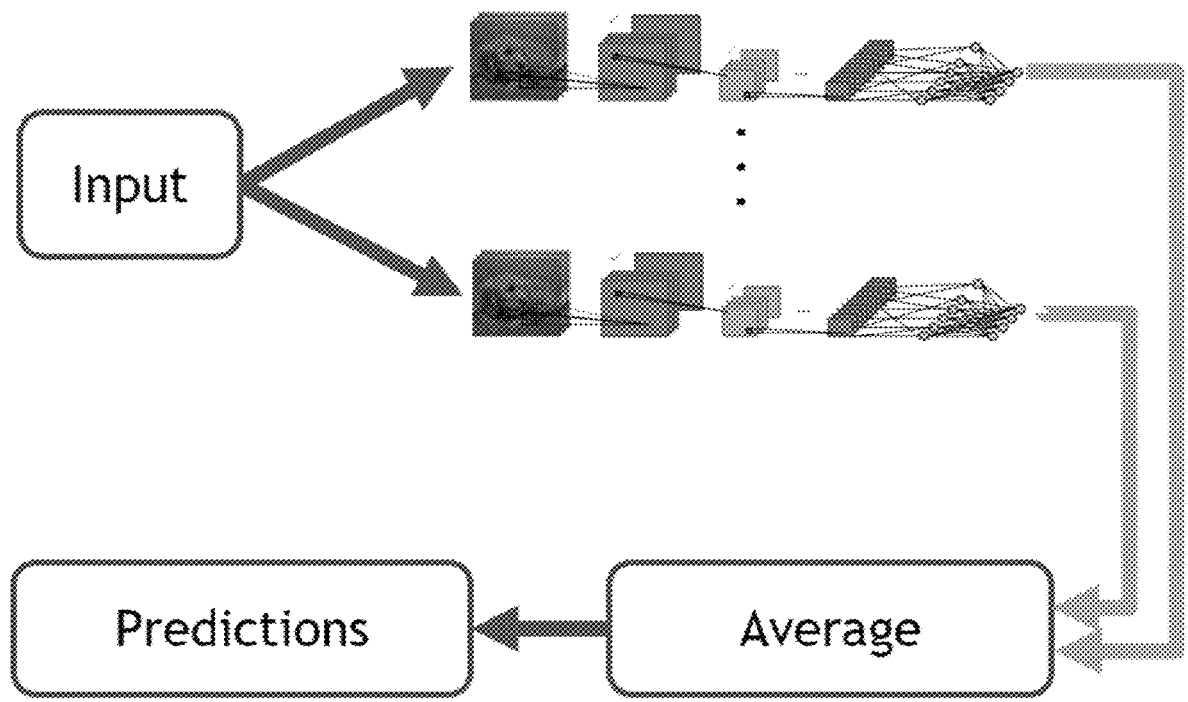
FIG. 2B illustrates exemplary ensemble processing.

The basic idea is to train multiple DNNs independently, each with the same architecture, and evaluate each input data using all of them as shown in FIG. 2B. This idea is amenable in scenarios where there exists enough time or energy budget to justify evaluating the input on a number of networks. Since the reduction in energy from the proposed MF-DFP are so dramatic, the designer may implement an ensemble of MF-DFP networks in parallel and still save significantly in energy consumption. More specifically, we show that an ensemble of multiplier-free dynamic fixed-point networks can outperform a floating-point network while still achieving significant energy saving. In order to construct such ensemble, we run Algorithm 1 multiple times with different starting floating-point networks on line 1.

While we maintain low-precision in both network signals and parameters for efficiency, providing the network with the flexibility to change the location of the radix point from layer to layer is necessary for minimizing the accuracy degradation. While improving the accuracy, this scheme incurs complexities in the hardware design as some bookkeeping in needed to keep track of the location of the radix point in different parts of the network. In our accelerator, we enable such flexibility by providing each set of calculations with details on the indices of both the input feature maps as well as the output activation. More specifically, we implement this feature by adding control signals dedicated to both the input feature, and the output activation radix indices. Dedicated hardware is then added to the hardware to shift the result to the correct index as determined by the radix indices.

On the other hand, while dynamic fixed-point representation for synaptic weights and activation maps allows for compact bit widths, during inference, we would still need to perform fixed-point multiplications. We quantize the weights to integer power-of-two, which would allow the expensive multiplications to be replaced with arithmetic shifts. These shift operators are far more hardware-friendly than full-scale multipliers. In this quantization scheme, for each weight w, we represent its quantized version using two numbers $\langle s, e \rangle$, where s is the sign of the weight w, and $e=\max[\text{round}(\log_2(|w|)), -7]$ is the exponent for the power of 2 (i.e., $2^e$). Here, round( ) performs rounding to the nearest integer. Note that we bound $e \geq -7$ since our input data is limited to 8 bits. For each input x, x·w is then transformed into $(s \cdot x) \ll e \gg$, where $\ll \gg$ represents the shift operator. In addition, we observe that the magnitudes of the weights is less than 1, so rounding leads to eight possible exponents $\{0, -1, \ldots, -7\}$. Therefore the weights can be encoded into 4-bit representation.

Figure 3:
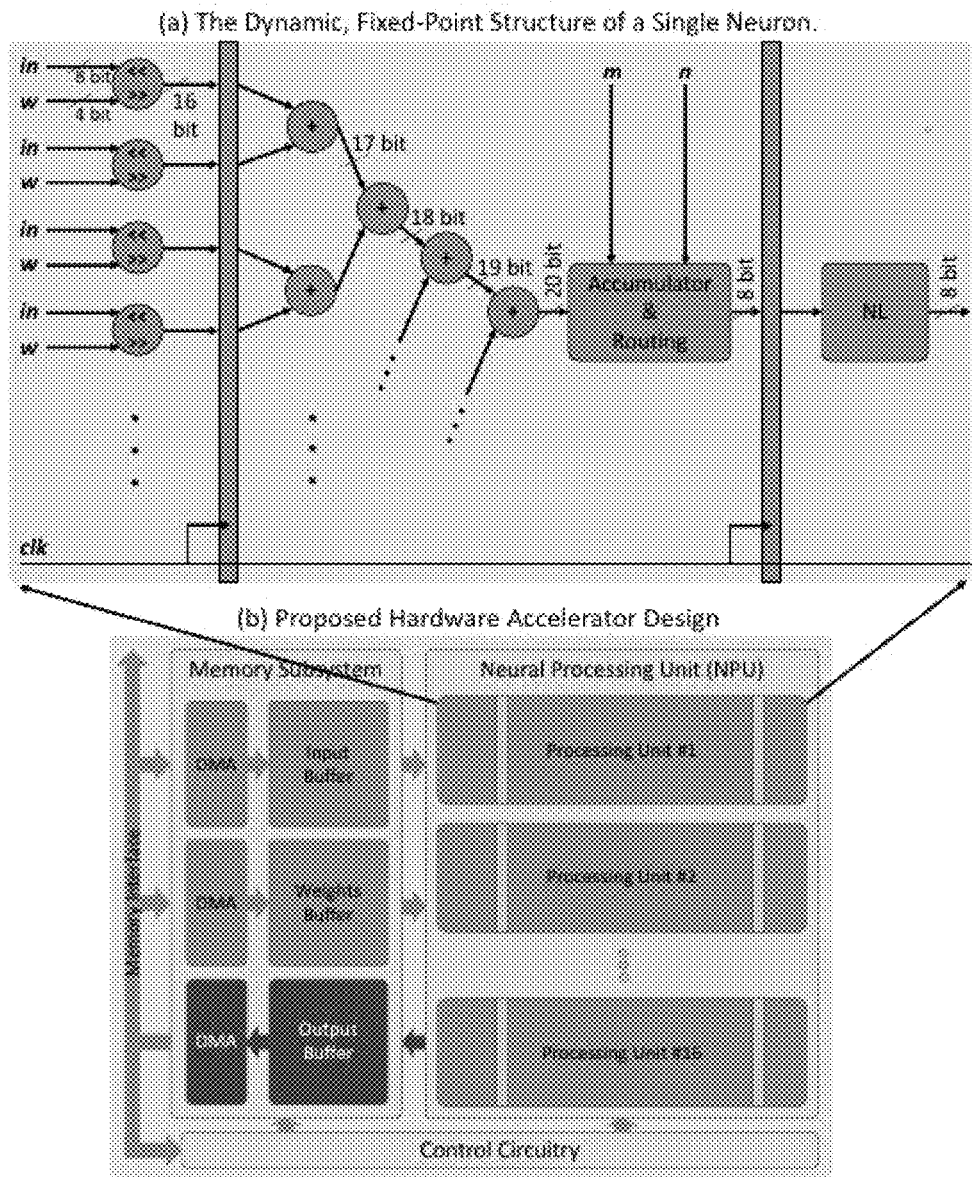
FIG. 3 illustrates an exemplary hardware accelerator design (a) a single neuron and (b) the organization of neurons and hardware blocks.

To further improve the accuracy, we ensure that there is no loss in intermediate values by mitigating the possibility of overflows. In order to do so, we ensure that all intermediate signals have large enough word-width, thereby effectively increasing the width of the intermediate wires as needed. To illustrate, FIG. 3(a) shows the simplified structure of a single neuron in our implementation, highlighting the main feature of the accelerator design. In FIG. 3(a), the dedicated hardware implementing the dynamic fixed-point scheme is shown as "Accumulator & Routing." Here m and n represent the locations of the radix points for the input features and output activations respectively.

In order to integrate our neuron architecture into a full-scale hardware accelerator, we utilize a tile-based implementation, where each cycle a small number of physical neurons is fed a new set of data for calculation. We implement three separate memory subsystems assigned to input data, weights, and output data, respectively. This memory subsystem ensures the isolation of memory transfers from the calculation for maximum throughput. The computation itself is performed in neural processing units (NPUs) containing a number of processing units each implementing 16 neurons with 16 synapses.

FIG. 3(b) illustrates the organization of our hardware accelerators.

In order to incorporate the ensemble of networks, the number of processing units is increased as needed to parallelize the computation of an ensemble of networks. Note that the memory subsystems as well as the control logic also need to be modified to account for the number of processing units.

We have implemented and compared our hardware design with a conventional 32-bit floating-point architecture using a single processing unit as a baseline. Compared to our invention, the baseline implementation utilizes multipliers in the first stage of the design and keeps the bit width constant at 32-bits throughout the design for both the activations and the network parameters.

For CIFAR-10, we begin by training the floating-point networks using the benchmark architecture. For the ImageNet benchmark, we obtain the floating-point model from a Caffe Model Zool. We then run the networks on their corresponding training set data to obtain the pre-softmax output logits. From these floating-point networks, we construct our proposed MF-DFP networks using Algorithm 1.

For our hardware evaluations, we compile our designs using Synopsys Design Compiler and a 65 nm standard cell library in the typical processing corner. We synthesize our hardware so that we have zero timing slack for the floating-point design. Therefore, we use a constant clock frequency of 250 MHz for all our experiments. While the utilization of barrel shifters instead of multipliers provides us with timing slacks which can be used to boost the frequency, we choose to keep the frequency constant as changing the frequency adds another dimension for evaluation which is out of the scope of this work.

We evaluated our invention as well as our custom hardware accelerator on CIFAR-10 and ImageNet using a broad range of performance metrics including accuracy, power consumption, design area, inference time, and inference accuracy. Table 1 below summarizes the design area and the power consumption of the proposed multiplier-free custom accelerator.

TABLE 1

Design metrics of the proposed MF-DFP accelerator against the floating-point baseline.

| Precision (in, w) | Design Area (mm$^2$) | Power Cons. (mW) | Area Saving (%) | Power Saving (%) |
|---|---|---|---|---|
| Floating-point(32,32) | 16.52 | 1361.61 | 0 | 0 |
| Proposed MP-DFP(8,4) | 1.99 | 138.98 | 87.97 | 89.79 |
| Ens. MF-DFP(8,4)' | 3.96 | 270.27 | 76.00 | 80.15 |

Values shown in parenthesis, (in,w), reflect the number of bits required for the representation of inputs and weights respectively. We also implement a floating-point version of our accelerator as a baseline design and for comparison.

As shown in the table our accelerator can achieve significant benefits in both design area and power consumption using both one processing unit and using an ensemble of two networks.

Figure 4:
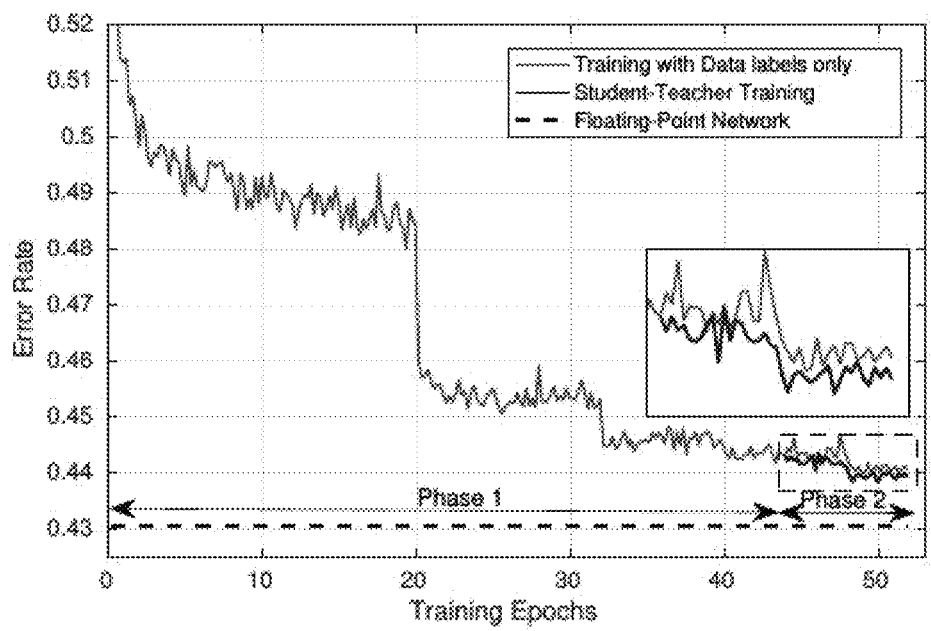
FIG. 4 illustrates the classification error rate of the baseline floating-point network.

FIG. 4 shows the classification error rate of the baseline floating-point network as well as the fine-tuning process of MF-DFP for the ImageNet benchmark. Here, we observe that by fine-tuning using just data labels (Phase 1), we achieve significant performance with less than a 1% increase in error rate than the floating-point counterpart. Additional training using the student-teacher model (Phase 2) on top of just data labels, allows us to reduce the error rate even more. In this experiment, we observed that more benefit is achieved when the student-teacher training is started from a non-global optimal point in the data labels-only training. More specifically, the value of i in Algorithm 1 line 11 should be close to convergence but not the global optimal point in the training process. In either case, the student-teacher learning provides consistently better performance than using the data labels-only training. For this training, we set $\tau=20$, $\beta=0.2$ and start with a learning rate of 1e-03. We decrease the rate by a factor of 10 when learning levels off and stop the training when the learning rate drops below 1e-07.

Furthermore, in Table 2 below, we summarize the accuracy, inference time, and the energy performance of our techniques.

TABLE 2

Time, energy and top-1 accuracy for CIFAR-10 and ImageNet. In addition, for Imagenet, we also show in parenthesis the top-5 accuracy. Ensemble accuracy is obtained by deploying two MF-DFP networks.

| | CTFAR-10 | | | |
|---|---|---|---|---|
| Precision | Classification Accuracy (%) | Time (us) | Energy (uJ) | Energy Saving (%) |
| Floating-Point (32,32) | 81.53 | 246.52 | 335.68 | 0 |
| MF-DFP (8,4) | 80.77 | 246.27 | 34.22 | 89.81 |
| Ensemble MF-DFP | 82.61 | 246.27 | 66.56 | 80.17 |

| | ImageNet | | | |
|---|---|---|---|---|
| Precision | Classification Accuracy (%) | Time (us) | Energy (uJ) | Energy Saving (%) |
| Floating-Point (32,32) | 56.95 (79.88) | 15666.45 | 21332.38 | 0 |
| MF-DFP (8,4) | 56.16 (79.13) | 15666.06 | 2176.96 | 89.80 |
| Ensemble MF-DFP | 57.57 (80.29) | 15666.06 | 4234.07 | 80.15 |

As shown in the table, our methodology can achieve energy savings as high as 89% in the case of single MF-DFP network with a maximum of 0.79% degradation in accuracy for both benchmarks. This is especially significant as there is absolutely no modification to network depth and channel size. In addition, with the extra area budget, we implement two processing units in our accelerator and, for each benchmark, we deploy an ensemble of two MF-DFP networks trained using different starting points. As shown in Table 2, we can outperform the floating networks in both benchmarks using this ensemble while still achieving significant energy saving.

Finally, while designed our methodology with memory footprint in mind, we do not include the power consumption of the main memory subsystem in our evaluations. However, as a general guideline, our methodology emphasizes on reductions in network precisions and therefore requires 8× less memory compared to a floating-point implementation as shown in Table 3. For the ensemble method, the memory requirement essentially doubles from single MF-DFP, however, they are still far lower than the floating-point networks.

TABLE 3

Comparison of memory requirements for floating-point versus MF-DFP network parameters for CIFAR-10 and ImageNet benchmarks.

| Precision | CIFAR-10 (MB) | ImageNet (MB) |
|---|---|---|
| Floating-Point | 0.3417 | 237.95 |
| MF-DFP | 0.0428 | 29.75 |
| Ensemble MF-DFP | 0.0855 | 59.50 |

In summary, one embodiment of our invention is a hardware-software codesign approach that enables seamless mapping of full-precision deep neural networks to a multiplier-free dynamic fixed-point network. No change to the network architecture is required to maintain accuracy within acceptable bounds. We use student-teacher learning for accuracy improvements in low-precision networks. We use a hardware design capable of incorporating the dynamic fixed point as well as the multiplier-free design aspects. We utilize an ensemble of lower precision ML-DFP networks to increase the accuracy even further.

Figure 5:
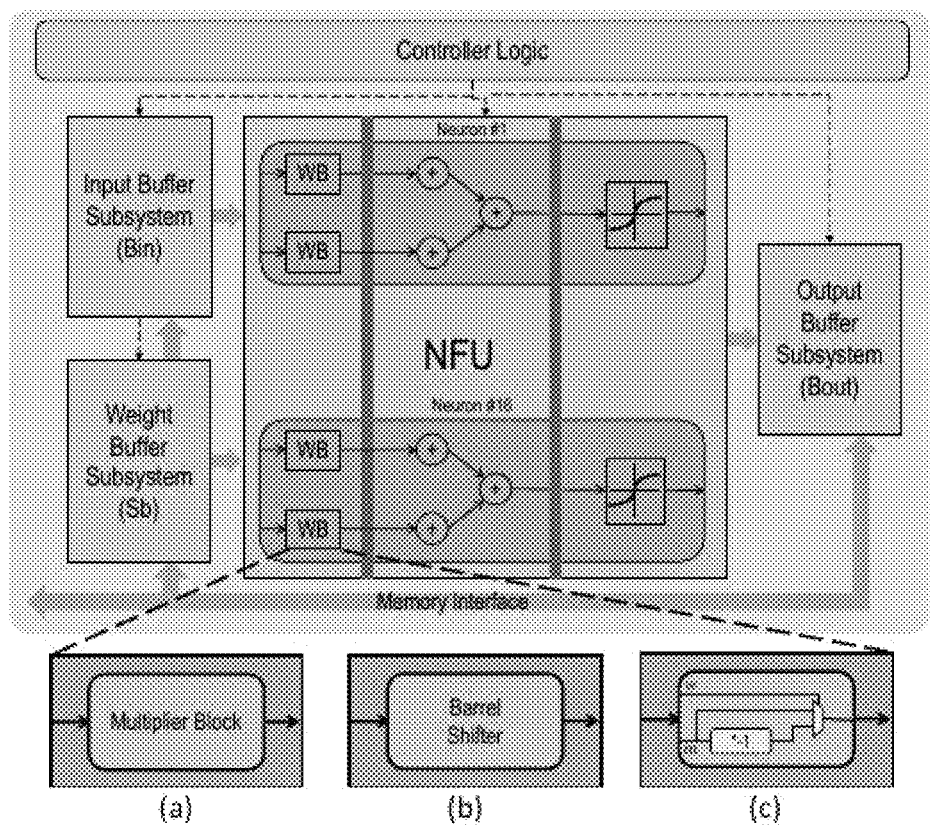
FIG. 5 is a block diagram of another exemplary hardware accelerator.

As described above, we adopt a tile-based hardware accelerator. We implement 16 neuron processing units each with 16 synapses. FIG. 5 shows another embodiment of hardware implementation. Three separate memory subsystems are used to store the intermediate values and outputs and buffer the inputs and weights. These subsystems are comprised of an SRAM buffer array, a DMA, and control logic responsible for ensuring that the data is loaded into the buffers and made available to the neural functional unit (NFU) at the appropriate clock cycle without additional latency. The NFU pipelines the computation into three stages, weight blocks (WB), adder tree (AT), and non-linearity function (NL). The weight blocks will be modified to accommodate for different precisions and quantizations as needed. In the case of binary precision, we merge the first two pipeline stages, effectively leading to a two stage NFU, in order to reduce the runtime. Furthermore, the size of all buffers and the control logic are modified according to the precision.

We include a training phase in our experiments to enable the network to determine appropriate weights and adapt to the lower precision. Training processes, in nature, require high precision in order to converge to a good minima as the increments made to the parameters can be extremely small. On the other hand, if the network is made aware of its inference restrictions (in our case, the limited precision), the training process can potentially compensate for some of the errors by fine-tuning the parameters and therefore improve the accuracy at no extra cost.

While the effects of reduced precision are analytically complicated to formulate as part of the training process, intuitive techniques can be utilized to improve the test phase accuracy. One approach is to utilize a set of full precision weights, trained independently, as the starting point of a re-training process, in which the weights and inputs are restricted to the specified precision. This approach assumes that by using lower precisions, close to optimal performance can be obtained if a local search is performed around the optimal set of parameters as learned with full precision.

Another prior approach for improving the accuracy is to utilize weights with different precisions in different parts of the training process. They solve the zero-gradient issue by keeping two sets of weights: one in full precision and one in the selected lower precision. The network is then trained using the full precision values during backward propagation and parameter updates, while approximating and using low precision values for forward passes. This approach allows for the accumulation of small gradient updates to eventually cause incremental updates in the lower precision.

We train all of the low precision networks using a combination of the first and second approaches. We initialize the parameters for lower precision training from the floating point counterpart. Once initialized, we train by keeping two sets of weights.

While significant savings in power, area, and computation time can be achieved using lower precisions, even a small degradation in accuracy can prohibit their use in many applications. However, we observe that, due to the nature of neural networks, the benefits obtainable by using lower precisions are disproportionately larger than the resulting accuracy degradation. This opens a new and intriguing dimension, where the accuracy can be boosted by increasing the number of computations while still consuming less energy. We therefore propose increasing the number of operations by increasing network size, as needed to maintain accuracy while spending significantly less for each operation.

We evaluated our designs both in terms of accuracy and design metrics (i.e., power, energy, memory requirements, design area). To measure accuracy, we adopt a Caffe-based framework extended to simulate fixed-point operation. We modify it to accommodate our techniques, as needed. In different experiments, we ensure that all design parameters except for the bit precision are the same. This is critical to ensure the isolation of the effects of bit precision from any other factor.

As described above, we compiled our designs using Synopsys Design Compiler using a 65 nm industry strength technology node library. We use a 250 MHz clock frequency and synthesize in nominal processing corner. We design our accelerator to have a zero timing slack for the full-precision accurate design. We confirm the functionality of our hardware implementation with extensive simulations. As before, we ensure that all other network parameters, including the frequency, are kept constant across different precision experiments.

We consider three well-recognized neural network architectures utilized with three different datasets, MNIST using the LeNet architecture, SVHN using CONVnet, and CIFAR-10 using the network (here we refer to this network as ALEX). For all cases, we randomly select 10% of each classification category from the original test set as our validation set. To showcase the benefits from increasing the network size while using lower precision, we evaluate two networks as summarized in Table 4.

TABLE 4

BENCHMARK NETWORKS ARCHITECTURE DESCRIPTIONS.

| MNIST | SVHN | CIFAR-10 |
|---|---|---|
| LeNet [14] | ConvNet [19] | ALEX [12] |
| 28 × 28 × 1 | 32 × 32 × 3 | 32 × 32 × 3 |
| conv 5 × 5 × 20 | conv 5 × 5 × 16 | conv 5 × 5 × 32 |
| maxpool 2 × 2 | maxpool 2 × 2 | maxpool 3 × 3 |
| conv 5 × 5 × 50 | conv 7 × 7 × 512 | conv 5 × 5 × 32 |
| maxpool 2 × 2 | maxpool 2 × 2 | avgpool 3 × 3 |
| innerproduct 500 | innerproduct 20 | conv 5 × 5 × 64 |
| innerproduct 10 | innerproduct 10 | avgpool 3 × 3 |
|  |  | innerproduct 10 |

Here, we focus on CIFAR-10 since MNIST and SVHN do not provide a large range in accuracy differences between various precisions and quantizations. As summarized in Table 5,

TABLE 5

ALEX LARGER NETWORK ARCHITECTURE DESCRIPTIONS.
CIFAR-10

| ALEX+ | ALEX++ |
|---|---|
| 32 × 32 × 3 | 32 × 32 × 3 |
| conv 5 × 5 × 64 | conv 3 × 3 × 64 |
| maxpool 3 × 3 | maxpool 2 × 2 |
| conv 5 × 5 × 64 | conv 3 × 3 × 128 |
| avgpool 3 × 3 | maxpool 2 × 2 |
| conv 5 × 5 × 128 | conv 3 × 3 × 256 |

TABLE 5-continued

ALEX LARGER NETWORK ARCHITECTURE DESCRIPTIONS.
CIFAR-10

| ALEX+ | ALEX++ |
|---|---|
| avgpool 3 × 3 | maxpool 2 × 2 |
| innerproduct 10 | innerproduct 512 |
|  | innerproduct 10 | we evaluate two larger variations of the ALEX network: (1) ALEX+, where the number of channels in each convolutional layer is doubled, and (2) ALEX++, where the number of channels is doubled when the feature size is halved.

This methodology results in significant improvements in accuracy while still delivering significant savings in energy.

Figure 6:
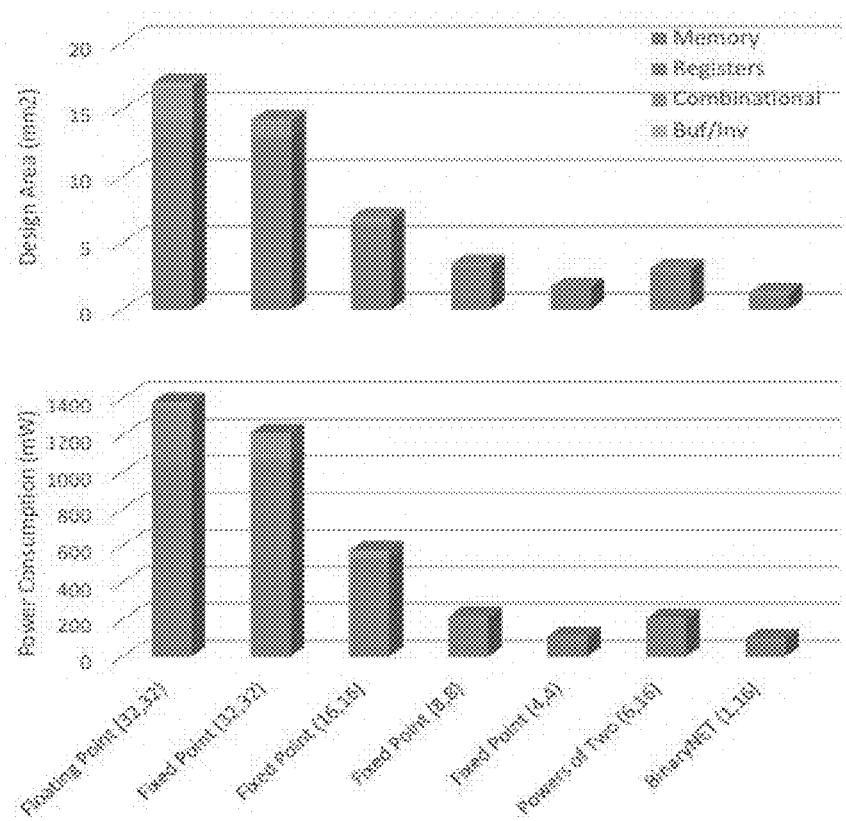
FIG. 6 shows an exemplary breakdown of power and area for the hardware accelerator.

FIG. 6 shows the breakdown of power and area for the accelerator. Values shown as (w, in) represent the number of bits required for representing weight and input values, respectively. Note, that these graphs do not reflect the power consumption of the main memory. As shown in the figure, the majority of the resources, both in power and design area, are utilized in the memory buffers necessary for seamless operation of the computational logic. To be more specific, the buffers consume between 75%-93% of the total accelerator power, while using 76%-96% of the total design area. These values highlight the necessity of approximation approaches targeting the memory footprint.

Table 6 summarizes the design metrics of the accelerator for each of the numerical precisions considered.

TABLE 6

DESIGN METRICS OF THE EVALUATED NUMERICAL
PRECISIONS AND QUANTIZATIONS,

| Precision (w, in) | Design Area (mm²) | Power Cons. (mW) | Area Saving (%) | Power Saving (%) |
|---|---|---|---|---|
| Floating-Point (32,32) | 16.74 | 1379.60 | 0 | 0 |
| Fixed-Point (32,32) | 14.13 | 1213.40 | 15.56 | 12.05 |
| Fixed-Point (16,16) | 6.88 | 574.75 | 58.92 | 58.34 |
| Fixed-Point (8,8) | 3.36 | 219.87 | 79.94 | 84.06 |
| Fixed-Point (4,4) | 1.66 | 111.17 | 90.07 | 91.94 |
| Powers of Two (6,16) | 3.05 | 209.91 | 81.78 | 84.78 |
| Binary Net (1,16) | 1.21 | 95.36 | 92.73 | 93.08 |

In order to maintain a fair comparison, we keep all the other parameters, such as the frequency, number of hardware neurons, etc., constant among different precisions. Changing the frequency or the accelerator parameters (other than precision) adds another dimension to the design space exploration.

We evaluate the accuracy of the networks, as well as energy requirements for processing each image for each of our benchmarks. Table 7 summarizes the results for MNIST and SVHN datasets. We achieved little to no accuracy drop for all but one of the network precisions in MNIST classification.

TABLE 7

THE ACCURACY, PER IMAGE INFERENCE ENERGY, AND
THE ENERGY SAVINGS ACHIEVABLE USING EACH OF
THE EVALUATED PRECISIONS. FOR EACH DATASET,
ENERGY SAVINGS ARE IN REFERENCE TO THE
FULL-PRECISION IMPLEMENTATION.

| | MNIST | | | SVHN | | |
|---|---|---|---|---|---|---|
| Precision (w, in) | Class. Acc. (%) | Energy (uJ) | Energy Sav. (%) | Class. Acc. (%) | Energy (uJ) | Energy Sav. (%) |
| Floating-Point (32,32) | 99.20 | 60.74 | 0 | 86.77 | 754.18 | 0 |
| Fixed-Point (32,32) | 99.22 | 52.93 | 12.86 | 86.78 | 663.01 | 12.09 |
| Fixed-Point (16,16) | 99.21 | 24.60 | 59.50 | 86.77 | 314.05 | 58.36 |
| Fixed-Point (8,8) | 99.22 | 8.86 | 85.41 | 84.03 | 120.14 | 84.07 |
| Fixed-Point (4,4) | 95.76 | 4.31 | 92.90 | NA | NA | NA |
| Powers of Two (6,16) | 99.14 | 8.42 | 86.13 | 84.85 | 114.70 | 84.79 |
| Binary Net (1,16) | 99.40 | 3.56 | 94.13 | 19.57 | 52.11 | 93.09 |

In the case of SVHN, however, while keeping the network architecture constant, the 4-bit fixed-point and binary representations failed to converge. For SVHN dataset, for instance in the case of powers of two network, we are able to achieve more than 84% energy saving with an accuracy drop of approximately 2%. Note that as we keep the frequency constant the processing time per image changes very marginally among different precisions.

The reduction in precision also reduced the required memory capacity for network parameters, as well as the input data. We quantify our memory requirements for all the network architectures using different bit precisions. In our experiments, for the full-precision design, network parameters require approximately 1650 KB, and 2150 KB, and 350 KB of memory for LeNet, CONVnet, and ALEX, respectively. Since there is a direct correlation between bit precision and network memory requirements, the memory footprint of each network reduces from 2× to 32× for different bit precisions.

We embrace that a portion of the benefits from using low precision arithmetic can be exploited to boost the accuracy to match that of the floating point network while spending some portion of the energy savings by increasing the network size. Here, we showcase the benefits from our proposed methodology on CIFAR-10 dataset. The summary of the performances for the ALEX as well as the two larger networks (ALEX+ and ALEX++) is provided in Table 8.

TABLE 8

NETWORK PERFORMANCE FOR DIFFERENT PRECISION
ON CIFAR-10 DATASET AND USING ALEX, ALEX+, AND
ALEX++ ENERGY SAVINGS ARE IN REFERENCE TO THE
ALEX FULL-PRECISION IMPLEMENTATION.

| | CIFAR-10 | | |
|---|---|---|---|
| Precision (w, in) | Class. Acc (%) | Energy (uJ) | Energy Sav. (%) |
| Floating-Point (32,32) | 81.22 | 335.68 | 0 |
| Fixed-Point (32,32) | 79.71 | 293.90 | 12.45 |
| Fixed-Point (16,16) | 79.77 | 136.61 | 59.30 |
| Fixed-Point+ (16,16) | 81.56 | 491 32 | 1.5x Mor |
| Fixed-Point++ (16,16) | 82.26 | 628.17 | 1.9x More |

TABLE 8-continued

NETWORK PERFORMANCE FOR DIFFERENT PRECISION
ON CIFAR-10 DATASET AND USING ALEX, ALEX+, AND
ALEX++ ENERGY SAVINGS ARE IN REFERENCE TO THE
ALEX FULL-PRECISION IMPLEMENTATION.

| | CIFAR-10 | | |
|---|---|---|---|
| Precision (w, in) | Class. Acc (%) | Energy (uJ) | Energy Sav. (%) |
| Fixed-Point (8,8) | 77.99 | 49.22 | 85.34 |
| Fixed-Point+ (8,8) | 78.71 | 177.02 | 47.27 |
| Fixed-Point++ (8,8) | 75.03 | 226.32 | 32.59 |
| Powers of Two (6,16) | 77.03 | 46.77 | 86.07 |
| Powers of Two+ (6,16) | 77.34 | 168.21 | 49.89 |
| Powers ofTwo++ (6,16) | 81.26 | 215.05 | 35.93 |
| Binary Net (1,16) | 74.84 | 19.79 | 94.10 |
| Binary Net+ (L16) | 77.91 | 71.18 | 78.80 |
| Binary Net++ (1,16) | 80.52 | 91.00 | 72.89 |

As shown in the table, lower precision networks can outperform the baseline design in accuracy while still delivering savings in terms of energy. The parameter memory requirements for the full-precision networks are roughly 350 KB, 1250 KB, and 9400 KB for ALEX, ALEX+, and ALEX++ respectively. As discussed previously, the memory footprint reduces linearly with parameter precision when reducing the precision.

Figure 7:
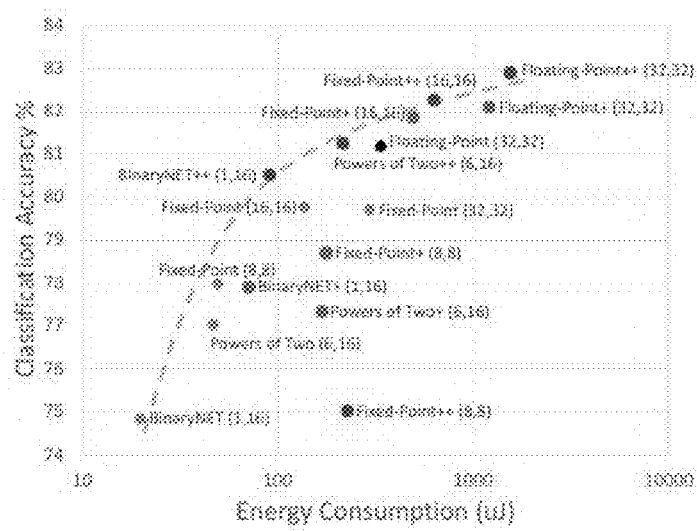
FIG. 7 illustrates an exemplary plot.

The available trade-offs in terms of accuracy and energy using different precisions and expanded networks are plotted in FIG. 7 for the CIFAR-10 test bench. The figure highlights the previous argument that a wide range of power and energy savings are possible using different precisions while maintaining acceptable accuracy. Further, when operating in low precision/quantization, a portion of the obtained energy benefits can be reappropriated to recoup the lost accuracy by increasing the network size. This methodology can eliminate the accuracy drop (for example in the case of Power of Two++ (6,16)) while still delivering energy savings of 35.93%. The figure highlights that larger networks with lower precision can dominate the full-precision baseline design in both accuracy and energy requirements.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A method comprising:
providing a hardware-software codesign to transform existing floating-point networks to 8-bit dynamic fixed-point networks with 4-bit integer power-of-two weights, consisting of 1 sign bit and 3-bit exponent, without changing a network topology, the power-of-two weights enabling a multiplier-free hardware accelerator to perform computation on dynamic fixed-point precision,
wherein the hardware-software codesign utilizes a two-phase training method comprising an 8-bit dynamic fixed-point with power-of-two weight training using backpropagation with gradients computed from true labels phase followed by an 8-bit dynamic fixed-point with power-of-two weight training using backpropagation with gradients computed from true labels and gradients computed from floating-point teacher network's logits phase to improve the accuracy of the dynamic fixed-point network with power-of-two weights.

2. The method of claim 1 wherein the teacher is a floating point network and the student network is a dynamic fixed-point network with power-of-two weights.

* * * * *